Dec. 20, 1938.   R. B. QUICK   2,141,091
MEANS FOR STOPPING ROTATION OF PROPELLERS
Filed Sept. 10, 1934
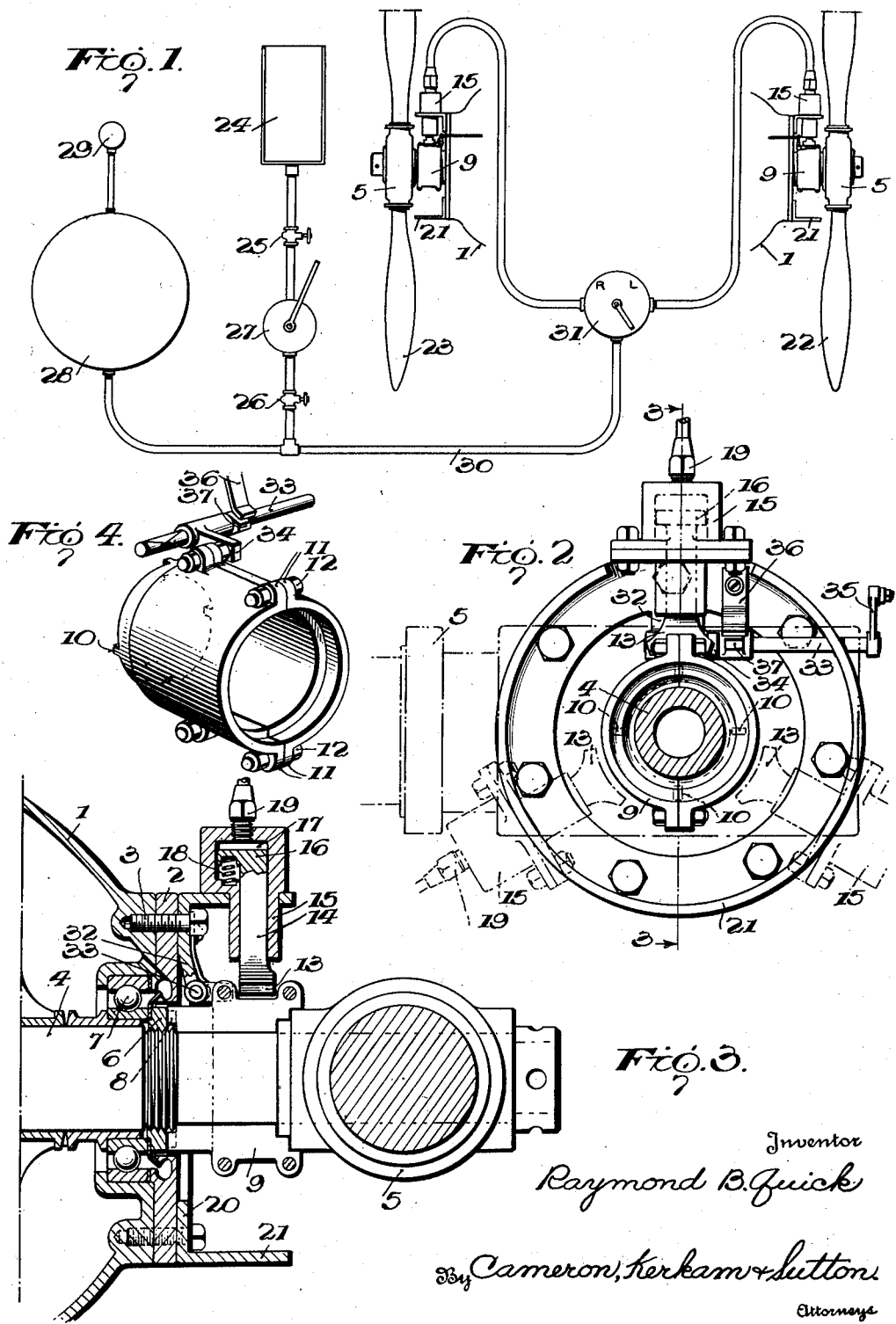

Patented Dec. 20, 1938

2,141,091

UNITED STATES PATENT OFFICE 2,141,091

MEANS FOR STOPPING ROTATION OF PROPELLERS

Raymond B. Quick, Garden City, N. Y., assignor, by direct and mesne assignments, of thirty-five and two-tenths per cent to J. Heron Crosman, III, Haverford, Pa., and two per cent to Miles H. Vernon, New York, N. Y., and two and eight-tenths per cent to John C. Kunkel, Harrisburg, Pa.

Application September 10, 1934, Serial No. 743,463

3 Claims. (Cl. 244—65)

This invention relates to means whereby a propeller of an airplane and particularly of a multi-engined airplane, can be stopped and maintained in a desired position during the flight of the plane.

When a plane is in flight with the engine cut off, the propeller continues to rotate due to a "windmill", action, carrying with it the engine pistons and moving parts. Due to interference of one idle rotating propeller with the flow of air over the wings of the plane and the resistance of the air, the speed and elevation which can be obtained by the other operating engines in a multi-engined ship are considerably reduced.

This loss may be very serious in case one engine cuts out during flight, since the distance which the plane can fly on its operating engines to a safe landing field is greatly reduced. The difficulties in landing are also greatly increased. Furthermore, multi-engined planes are now being designed wherein one or more engines are used only in case of emergencies and under special conditions, and the presence of idling propellers at other times means a serious loss in efficiency. Government regulations with respect to the capacity of commercial multi-engined ships to fly and land with less than all of their engines operating are also difficult to comply with for the above reasons.

Moreover, in multi-engined planes the dead engine is usually at a distance from the center of the ship, creating an unbalanced and unstable condition which must be corrected aerodynamically by the pilot. In some planes engines are so located that their propellers when dead modify the air currents around the tail of the ship in such a way as to cause excessive vibration of the tail of the ship and interfere seriously with the functioning of the controls.

In cases where the stopping of an engine is due to mechanical failure of some part, the continued rotation of the propeller may mean destruction of the engine and the vibration set up may endanger the entire ship.

One of the objects of the invention is to provide means whereby a propeller may be stopped and held stationary during the flight of the plane.

Another object is to provide means whereby a propeller may be stopped and locked in the most desirable position during the flight of the ship.

Another object is to provide a selective power means whereby any one or more of the propellers of a multi-engined plane can be stopped during flight and at the will of the pilot.

One embodiment of the invention is illustrated in the accompanying drawing, but it is to be expressly understood that said drawing is for purpose of illustration only and is not to be construed as a definition of the limits of the invention, reference being had to the appended claims for this purpose.

In the drawing,

Fig. 1 is a diagrammatic illustration of apparatus embodying the invention;

Fig. 2 is an end view of an engine crank case with the propeller removed;

Fig. 3 is a transverse section through Fig. 2; and

Fig. 4 is a detail of a brake drum and associated stop mechanism.

Preferably the means for stopping a propeller during flight takes the form of a brake actuated from a source of power under the control of the pilot. Since the crank shaft of the engine and the propeller are rigidly connected together, the brake may be applied at any convenient point on the driving shaft, either at the propeller end or at the opposite end. For simplicity in applying the invention to existing engines, however, it will generally be preferable to apply the brake at the propeller end intermediate the crank case and the propeller hub and the drawing illustrate by way of example a construction of this type. The braking device may also be of any suitable type, such as a friction band brake or a disk brake, etc., and may be operated from any suitable source of power, such as pressure or vacuum sources, electricity, or mechanical power storing or creating means. For purposes of illustration, the following description is directed to means comprising one or more brake shoes operated by fluid pressure and under the control of the pilot, but it will be understood that the invention is not limited to this particular embodiment.

Figs. 2 and 3 illustrate one suitable construction which may be employed. The nose 1 of the engine crank case is provided with the usual thrust plate 2 secured thereto by the usual studs 3. The propeller shaft 4 extends from the end of the crank case and carries the propeller hub 5 secured thereon in the usual on any suitable manner. The conventional thrust nut is shown at 6 and the thrust bearing at 7, said thrust nut being provided with the usual spanner slots 8.

Where a friction brake shoe or band is employed, the usual spacer collar which is interposed between the thrust nut 6 and the propeller hub 5 is preferably removed and replaced by a brake drum 9 to provide greater braking area, said drum being placed on the shaft 4 and locked thereto in any suitable manner as by means of lugs 10 which engage in the spanner slots 8 of the thrust nut, as shown in Fig. 3. In the form shown, the drum 9 is made in two sections provided with ears 11 through which extend bolts 12 to secure the sections together on the shaft. The surface of the drum between the ears 11 provides a braking surface and the interior of the drum is suitably shaped to fit closely on the shaft 4 and around the end of the propeller hub 5.

Any suitable number of brake shoes may be provided to engage the brake drum and three shoes spaced 120° apart are shown in Fig. 2, the two lower shoes being in dotted lines. Fig. 3 shows in section the upper shoe and a suitable operating mechanism for the same, where the brake is to be actuated by fluid pressure. The brake shoe 13, of any suitable type, material and construction, is carried by a piston member 14 slidable in a casing 15 and having a head 16 serving as a piston in the casing chamber 17. Suitable means such as the spring 18 are employed to maintain the shoe 13 normally out of engagement with the brake drum 9, but when a fluid under pressure is admitted to chamber 17 through the inlet connection 19, the piston head 16 is forced downwardly against the tension of spring 18 and the brake shoe 13 is applied to the brake drum to stop the rotation of the propeller.

The brake shoes and their operating mechanisms are mounted about the propeller shaft in any suitable way, and in the form shown use is made of the studs 3. A mounting ring 20 is carried on the engine crank case by the studs 3, said ring having a flange 21 in which the casings 15 are supported. This type of mounting is particularly adapted for use with existing engines of the type shown, but it will be understood that in new engines of this type and in engines of different types other suitable provision may be made.

The fluid employed to operate the brake pistons may comprise compressed gases or liquids as may be convenient, or vacuum brakes may be employed, and the pressure may be created by any suitable means such as hand operated pumps, electric pumps, etc. Where hydraulic pressure or the like is employed for operating retractable landing gear or for similar purposes, the same source of power may be employed for operating brake mechanisms as described above. The application of power to the brake mechanisms, whether pressure, vacuum or otherwise, is controlled by the pilot through a selective mechanism whereby any desired propeller can be braked at will.

One suitable system which may be employed is shown diagrammatically in Fig. 1 for purposes of illustration. This figure shows two propellers 22 and 23, each of which is provided with one or more braking devices as shown in Figs. 2 and 3. A suitable liquid is stored in the container 24 and by opening valves 25 and 26 and operating pump 27, which may be electrically or hand-operated, this liquid is pumped under pressure into a pressure tank 28 equipped with a gauge 29. A pipe 30 leads from said pressure tank 28 to a suitable distributing valve 31, which can be operated by the pilot to provide braking pressure for either propeller 22 or 23 as desired.

In ships having a plurality of engines, it is desirable to be able to release the brake shoes at one propeller, once it has been stopped, in order that the braking power may then be used to stop another propeller. To this end means are provided for locking a propeller against rotation, once it has been stopped, independently of the braking devices. Preferably this means is also arranged to lock the propeller in the position in which it causes least interference with the performance of the ship. Since the rotation of any given propeller under these conditions is always in the same direction, said locking means may comprise a stop which can be moved by the pilot into and out of the path of some movable part of the propeller shaft or hub, and like the braking means said stop may be located either at the propeller end or at the opposite end of the engine and may comprise one or more stops. In a device designed for application to existing engines, said locking means is preferably combined with the braking device and one suitable construction is shown in the drawing. The mounting ring 20 is provided with one or more lugs 32 providing bearings for a rock shaft 33 which carries a stop 34 movable into the path of movement of the ears 11 and bolts 12 at one end of the brake drum. The stop 34 can be moved from this position to a vertical position in which it does not interfere with propeller rotation, or vice versa, by rocking the shaft 33 which is provided with a rocking lever 35 for this purpose. Suitable means may be provided if desired to hold the stop in either of these positions, for example, a leaf spring 36 bearing on one of the two surfaces of a cam-shaped member 37 secured to the rock shaft.

The operation will be clear from the above description. When it is desired to stop a propeller, the pilot operates the distributing valve 31 to admit fluid under pressure to the braking devices for that propeller. Once the propeller has been stopped by the brakes, the stop 34 is moved into the path of the brake drum and the valve 31 again closed, releasing the pressure on the braking devices whereby it is available for stopping another propeller.

In case an engine stops during flight, its propeller can be stopped and held in the position most favorable for good performance, and this position can be controlled as by shifting the position of the brake drum on the shaft. If there has been mechanical failure in the engine, stopping the propeller will prevent further damage to the engine and vibration which might seriously endanger the ship. Further, by maintaining the propeller stationary the elevation and range of flight of the ship on its remaining engines are materially increased and unbalanced and unstable aerodynamic conditions are minimized. In ships in which an engine is intentionally used to take off but when in the air is reserved for emergencies, the invention is of great assistance.

While only one embodiment of the invention has been described and illustrated in the drawing, it is to be expressly understood that the invention is not limited to this embodiment but is capable of a variety of mechanical expressions, many of which will now occur to those skilled in the art. Further, it will be understood that the type and location of the braking and stop means, the nature and source of braking power and the type of selective control means, etc., may also vary from the embodiment illustrated within the range indicated above and defined by the claims without departing from the spirit of the invention. Reference should therefore be had to the appended claims for a definition of the limits of the invention.

What is claimed is:

1. In an airplane, the combination with a plurality of separate power units each comprising a propeller rotating about a substantially horizontal axis and having an engine connected therewith in driving relationship, said propellers being so mounted that their idle rotation interferes with the flow of air over the wing, of means for stopping the rotation of any one of said power units in flight comprising a separate braking device for each propeller, a common source of braking power, and common selective power control means whereby any one of said braking devices can be operated from said source of power to prevent windmilling of the associated propeller, said braking devices being applied to the propeller shafts adjacent the propellers opposed to the moving air in front of the engines to provide air cooling.

2. In an airplane, the combination of a plurality of separate power units each comprising a propeller rotating about a substantially horizontal axis and having an engine connected therewith in driving relationship, said propellers being so mounted that their idle rotation interferes with the flow of air over the wing, and means for stopping the rotation of any one of said units in flight comprising a separate brake means for each of said units, a fluid pressure brake-actuating device at each of said units for operating said brake means, a common fluid pressure supply means, and common selective valve means for connecting said supply means with said operating means at any desired power unit for preventing windmilling of the propeller, said brake means being applied to the propeller shafts adjacent the propellers exposed to the moving air in front of the engines to provide air cooling.

3. In an airplane, the combination with a plurality of separate power units each comprising a propeller rotating about a substantially horizontal axis and having an engine connected therewith in driving relationship, said propellers being mounted so that their idle rotation interferes with the flow of air over the wing of the plane, of means for stopping the rotation of any one of said units in flight comprising a brake drum intermediate the engine and the propeller and rigidly connected with the propeller, braking means mounted stationarily adjacent each of said drums, each of said means having a brake element movable into braking engagement with its drum, a common source of braking power, and common selective control means for applying power from said source to any one of said braking means, said brake drums surrounding the propeller shafts adjacent the propellers exposed to the moving air in front of the engines to provide air cooling.

RAYMOND B. QUICK.